US012647872B2

(12) United States Patent
Hegde et al.

(10) Patent No.:  US 12,647,872 B2
(45) Date of Patent:       Jun. 2, 2026

(54) SYSTEMS AND METHODS FOR MACHINE LEARNING BASED ACCESS CLASS BARRING

(71) Applicant: Outdoor Wireless Networks LLC, Richardson, TX (US)

(72) Inventors: Harsha Hegde, Buffalo Grove, IL (US); Minyan Shi, Bolton, MA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 347 days.

(21) Appl. No.: 18/361,508

(22) Filed: Jul. 28, 2023

(65) Prior Publication Data

US 2024/0056945 A1      Feb. 15, 2024

Related U.S. Application Data

(60) Provisional application No. 63/397,747, filed on Aug. 12, 2022.

(51) Int. Cl.
H04W 48/02          (2009.01)

(52) U.S. Cl.
CPC .................................. H04W 48/02 (2013.01)

(58) Field of Classification Search
None
See application file for complete search history.

(56) References Cited

U.S. PATENT DOCUMENTS

2022/0014963 A1*    1/2022  Yeh ......................... G06N 3/045
2022/0104064 A1*    3/2022  Kamat .............. H04W 28/0284

* cited by examiner

*Primary Examiner* — Idowu O Osifade

(74) *Attorney, Agent, or Firm* — Fogg & Powers LLC

(57)          ABSTRACT

Systems and methods for ML based ACB are provided herein. In an example, a system includes BBU(s), RU(s) communicatively coupled to the BBU(s), and antenna(s) communicatively coupled to the RU(s). Each respective RU of the RU(s) is communicatively coupled to a respective subset of the antenna(s). The BBU(s), the RU(s), and the antenna(s) are configured to implement a base station for wirelessly communicating with UEs in a cell. The system includes a machine learning computing system configured to: receive time data, traffic data, and location data; and determine predicted barring parameter(s) for the base station based on the time data, the traffic data, and the location data. The system is configured to: adjust barring factor(s) and/or barring time(s) in an information message based on the predicted barring parameter(s) for the base station; and send the information message with the adjusted barring factor(s) and/or barring time(s) to UEs in the cell.

20 Claims, 4 Drawing Sheets

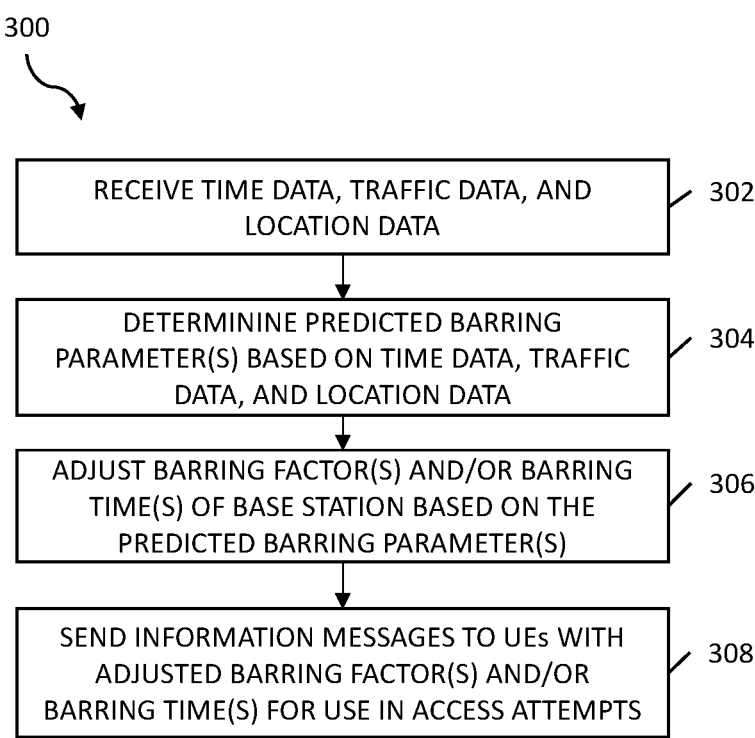

300

RECEIVE TIME DATA, TRAFFIC DATA, AND LOCATION DATA — 302

DETERMININE PREDICTED BARRING PARAMETER(S) BASED ON TIME DATA, TRAFFIC DATA, AND LOCATION DATA — 304

ADJUST BARRING FACTOR(S) AND/OR BARRING TIME(S) OF BASE STATION BASED ON THE PREDICTED BARRING PARAMETER(S) — 306

SEND INFORMATION MESSAGES TO UEs WITH ADJUSTED BARRING FACTOR(S) AND/OR BARRING TIME(S) FOR USE IN ACCESS ATTEMPTS — 308

FIG. 3

SYSTEMS AND METHODS FOR MACHINE LEARNING BASED ACCESS CLASS BARRING

CROSS-REFERENCE TO RELATED APPLICATIONS

This application claims priority to U.S. Provisional Application No. 63/397,747 filed on Aug. 12, 2022, and titled "SYSTEMS AND METHODS FOR MACHINE LEARNING BASED ACCESS CLASS BARRING," the contents of which are incorporated by reference herein in their entirety.

BACKGROUND

A centralized or cloud radio access network (C-RAN) is one way to implement base station functionality. Typically, for each cell (that is, for each physical cell identifier (PCI)) implemented by a C-RAN, one or more baseband unit (BBU) entities (also referred to herein simply as "BBUs") interact with multiple radio units (also referred to here as "RUs," "remote units," "radio points," or "RPs") in order to provide wireless service to various items of user equipment (UEs). The one or more BBU entities may comprise a single entity (sometimes referred to as a "baseband controller" or simply a "baseband band unit" or "BBU") that performs Layer-3, Layer-2, and some Layer-1 processing for the cell. The one or more BBU entities may also comprise multiple entities, for example, one or more central units (CU) entities that implement Layer-3 and non-time critical Layer-2 functions for the associated base station and one or more distributed units (DUs) that implement the time critical Layer-2 functions and at least some of the Layer-1 (also referred to as the Physical Layer) functions for the associated base station. Each CU can be further partitioned into one or more user-plane and control-plane entities that handle the user-plane and control-plane processing of the CU, respectively. Each such user-plane CU entity is also referred to as a "CU-UP," and each such control-plane CU entity is also referred to as a "CU-CP." In this example, each RU is configured to implement the radio frequency (RF) interface and the physical layer functions for the associated base station that are not implemented in the DU. The multiple RUs may be located remotely from each other (that is, the multiple RUs are not co-located) or collocated (for example, in instances where each RU processes different carriers or time slices), and the one or more BBU entities are communicatively coupled to the RUs over a fronthaul network.

SUMMARY

In some aspects, a system includes at least one baseband unit (BBU) entity, one or more radio units communicatively coupled to the at least one BBU entity, and one or more antennas communicatively coupled to the one or more radio units. Each respective radio unit of the one or more radio units is communicatively coupled to a respective subset of the one or more antennas. The at least one BBU entity, the one or more radio units, and the one or more antennas are configured to implement a base station for wirelessly communicating with user equipment in a cell. The system further includes a machine learning computing system configured to: receive time data, traffic data, and location data; and determine one or more predicted barring parameters for the base station based on the time data, the traffic data, and the location data. The system is configured to adjust one or more barring factors and/or one or more barring times in an information message based on the one or more predicted barring parameters for the base station; and send the information message with the adjusted one or more barring factors and/or one or more barring times to user equipment in the cell.

In other aspects, a method includes receiving time data, traffic data, and location data. The method further includes determining one or more predicted barring parameters for a base station based on the time data, the traffic data, and the location data. At least one baseband unit (BBU) entity, one or more radio units, and one or more antennas are configured to implement the base station for wirelessly communicating with user equipment in a cell. The one or more radio units communicatively coupled to the at least one BBU entity. The one or more antennas are communicatively coupled to the one or more radio units. Each respective radio unit of the one or more radio units is communicatively coupled to a respective subset of the one or more antennas. The method further includes adjusting one or more barring factors and/or one or more barring times in an information message based on the one or more predicted barring parameters for the base station. The method further includes sending the information message with the adjusted one or more barring factors and/or one or more barring times to user equipment in the cell.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which:

FIG. 3 illustrates a flow diagram of an example method of machine learning based access class barring.

Figure 1A:
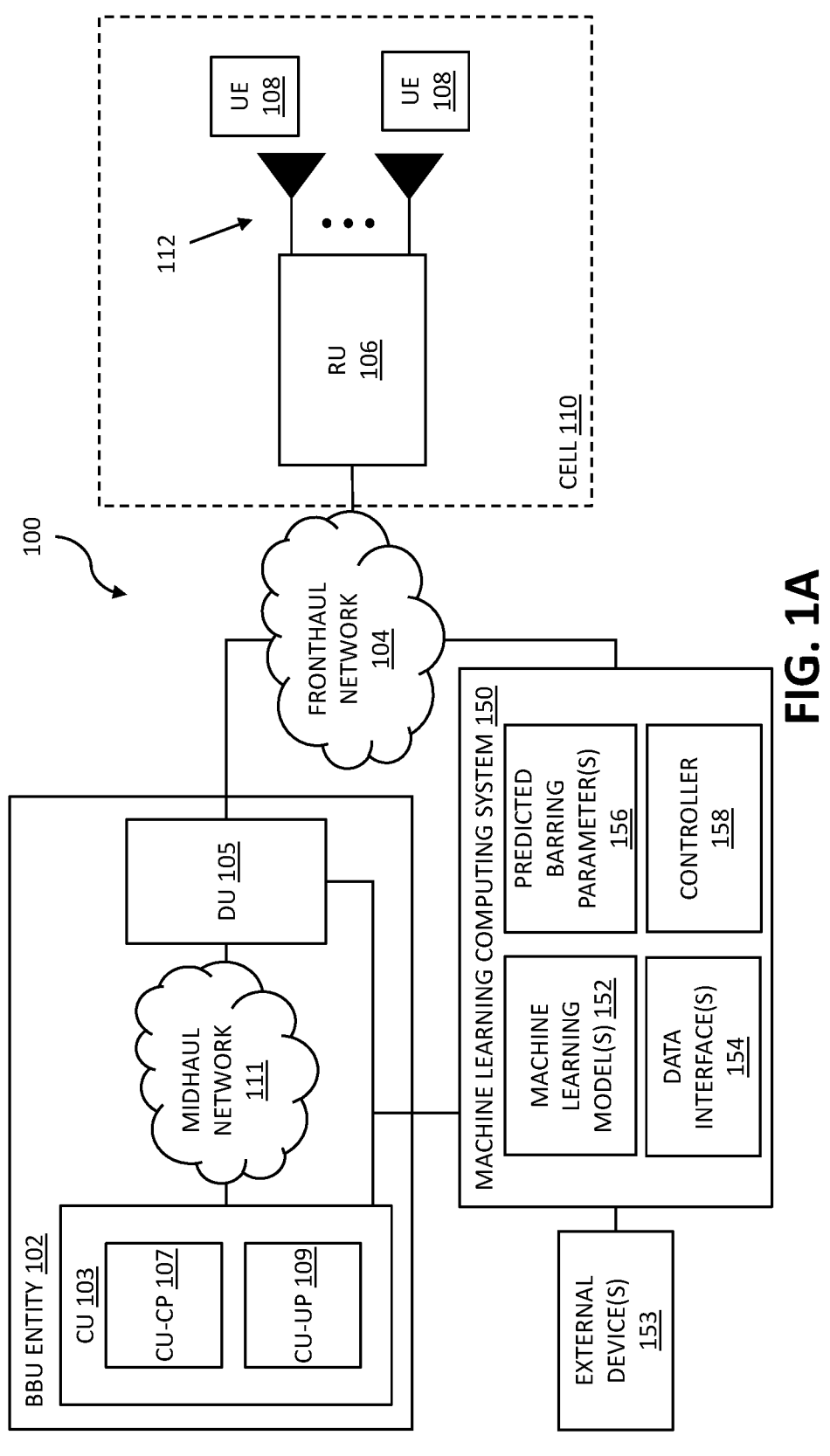
FIGS. 1A-1B are block diagrams illustrating example radio access networks.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be used and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

Events or disasters can lead to a large number of UEs attempting calls, which can lead to too many requests for the RAN to handle and cause an overload condition. This can potentially lead to signals from different UEs interfering with each other such that the signals are not decoded by the RAN (including access signals from high-priority users, for example, from first responders), decoded RRC request(s) being rejected by the RAN due to RRC resources being unavailable, and processing delays for establishing calls. In Long Term Evolution (LTE) and fifth generation (5G) New Radio (NR) networks, Access Class Barring (ACB) is used as a congestion avoidance mechanism by the RAN to control access requests from UEs. Generally, in idle mode, the access class/identity of a UE will determine the treatment that the UE receives for different call types (for example, emergency call, mobile originated signaling/data/voice/ SMS, paging for mobile terminated calls, etc.). There are several key parameters, which are all broadcast via System Information Blocks (SIB s), that must be configured for ACB across these different call types. The key parameters are Barring Factor, Barring Time, and Barring for Access Class/Identity. The Barring Factor, which is a value greater than or equal to 0 and less than 1, is used by UEs to determine if a cell is barred or not, the Barring Time indicates how long the cell will be treated as barred by UE, and the Barring for Access Class/Identity indicates if barring is applicable for a UE of a particular class/identity.

Once the configuration is pushed or broadcast by the RAN, a UE, prior to accessing the network, will generate a random number between 0 and 1. If the random number generated by the UE is smaller than the configured Barring Factor, then the UE will send the PRACH and start the access probe to access the network. If the random number generated by the UE is larger than the configured Barring Factor, then the UE waits for the configured Barring Time. After the Barring Time, the UE will generate a new random number and try again. By doing this, the RAN can control the access for UEs. By configuring the Barring Factor with a smaller value, fewer UEs will be able to connect to the network. Similarly, by increasing the Barring Time, UEs have to wait longer to join the network.

3GPP specifications (TS 36.331 and TS 38.331) allow for the Barring Factor and the Barring Time to be set separately for different Access Class/Identity of UEs. The Access Class/Identity of a UE can indicate whether the UE is a high priority user (for example, security related, mission critical, higher paying customer, etc.) or operator network personnel that should not be subjected to ACB and prevented from accessing the network. Besides Access Class/Identity of a UE, access can also be controlled based on the type of application or service requested by the UE. For example, in an emergency situation where some users are trying to make calls and others are trying to watch or upload a video, an operator would want to prioritize the call to go through and give a lower priority to the data user. The operator can use different access barring parameters for the different types of Access Class/Identity or uses.

The parameters for ACB can be configured statically by an operator, or dynamically based on conditions, to control the number of access requests. Currently, the adjustment of parameters requires either operator intervention or dynamic algorithms that adjust the ACB values in real-time based on observed load conditions. The adjustments are based on system loading information, which indicates a level of loading experienced by the system at a given time. If a system is lightly loaded, then little to no ACB is used. However, if the system is near or in an overload condition, then more significant ACB is used to reduce access to the network until the loading decreases. Different thresholds can be configured by an operator to trigger different levels of ACB for a network, and these thresholds can be configured based on analysis of past loading information for the hardware in the system.

There are a number of problems with current implementations of ACB, which need to be improved for operators to better utilize network capacity while also avoiding congestion. For manual configuration by operator intervention, it has proven difficult to determine the best values for the key parameters and the thresholds to trigger use of different levels of ACB for the network. For dynamic algorithms, systems typically support a fixed number of ACB levels and thresholds, which may not provide enough flexibility for the dynamically changing environments during emergencies. Further, the configurations in use today need to be modified as hardware is changed in radio access networks, which requires extensive work for operators to determine the thresholds for loading conditions, hysteresis, and the values for the ACB parameters that will best effect high-capacity utilization without congestion. Unfortunately, there is no direct feedback for current systems to indicate whether the configured ACB parameters are effective or optimal.

While the problems described above involve 5G NR systems, similar problems exist in LTE. Therefore, although the following embodiments are primarily described as being implemented for use to provide 5G NR service, it is to be understood the techniques described here can be used with other wireless interfaces (for example, fourth generation (4G) Long-Term Evolution (LTE) service) and references to "gNB" can be replaced with the more general term "base station" or "base station entity" and/or a term particular to the alternative wireless interfaces (for example, "enhanced NodeB" or "eNB"). Furthermore, it is also to be understood that 5G NR cells can be used in standalone mode, non-standalone mode (access barring applied at the 4G LTE cell when 5G NR cell operating in a pure NSA mode), or other modes developed in the future, and the following description is not intended to be limited to any particular mode. Also, unless explicitly indicated to the contrary, references to "layers" or a "layer" (for example, Layer-1, Layer-2, Layer-3, the Physical Layer, the MAC Layer, etc.) set forth herein refer to layers of the wireless interface (for example, 5G NR or 4G LTE) used for wireless communication between a base station and user equipment).

FIG. 1A is a block diagram illustrating an example base station 100 in which the techniques for machine learning based access class barring described herein can be implemented. In the particular example shown in FIG. 1A, the base station 100 includes one or more baseband unit (BBU) entities 102 communicatively coupled to a RU 106 via a fronthaul network 104. The base station 100 provides wireless service to various items of user equipment (UEs) 108 in a cell 110. Each BBU entity 102 can also be referred to simply as a "BBU."

In the example shown in FIG. 1A, the one or more BBU entities 102 comprise one or more central units (CUs) 103 and one or more distributed units (DUs) 105. Each CU 103 implements Layer-3 and non-time critical Layer-2 functions for the associated base station 100. Each DU 105 is configured to implement the time critical Layer-2 functions and at least some of the Layer-1 (also referred to as the Physical Layer) functions for the associated base station 100. Each CU 103 can be further partitioned into one or more control-plane and user-plane entities 107, 109 that handle the control-plane and user-plane processing of the CU 103, respectively. Each such control-plane CU entity 107 is also referred to as a "CU-CP" 107, and each such user-plane CU entity 109 is also referred to as a "CU-UP" 109.

The RU 106 is configured to implement the control-plane and user-plane Layer-1 functions not implemented by the DU 105 as well as the radio frequency (RF) functions. The RU 106 is typically located remotely from the one or more BBU entities 102. In the example shown in FIG. 1A, the RU 106 is implemented as a physical network function (PNF) and is deployed in or near a physical location where radio coverage is to be provided in the cell 110. In the example shown in FIG. 1A, the RU 106 is communicatively coupled to the DU 105 using a fronthaul network 104. In some examples, the fronthaul network 104 is a switched Ethernet fronthaul network (for example, a switched Ethernet network that supports the Internet Protocol (IP)).

The RU 106 includes or is coupled to a set of antennas 112 via which downlink RF signals are radiated to UEs 108 and via which uplink RF signals transmitted by UEs 108 are received. In some examples, the set of antennas 112 includes two or four antennas. However, it should be understood that the set of antennas 112 can include two or more antennas 112. In one configuration (used, for example, in indoor deployments), the RU 106 is co-located with its respective set of antennas 112 and is remotely located from the one or more BBU entities 102 serving it. In another configuration (used, for example, in outdoor deployments), the antennas 112 for the RU 106 are deployed in a sectorized configuration (for example, mounted at the top of a tower or mast). In such a sectorized configuration, the RU 106 need not be co-located with the respective sets of antennas 112 and, for example, can be located at the base of the tower or mast structure, for example, and, possibly, co-located with its serving one or more BBU entities 102.

While the example shown in FIG. 1A shows a single CU-CP 107, a single CU-UP 109, a single DU 105, and a single RU 106 for the base station 100, it should be understood that this is an example and other numbers of BBU entities 102, components of the BBU entities 102, and/or other numbers of RUs 106 can also be used.

Figure 1B:
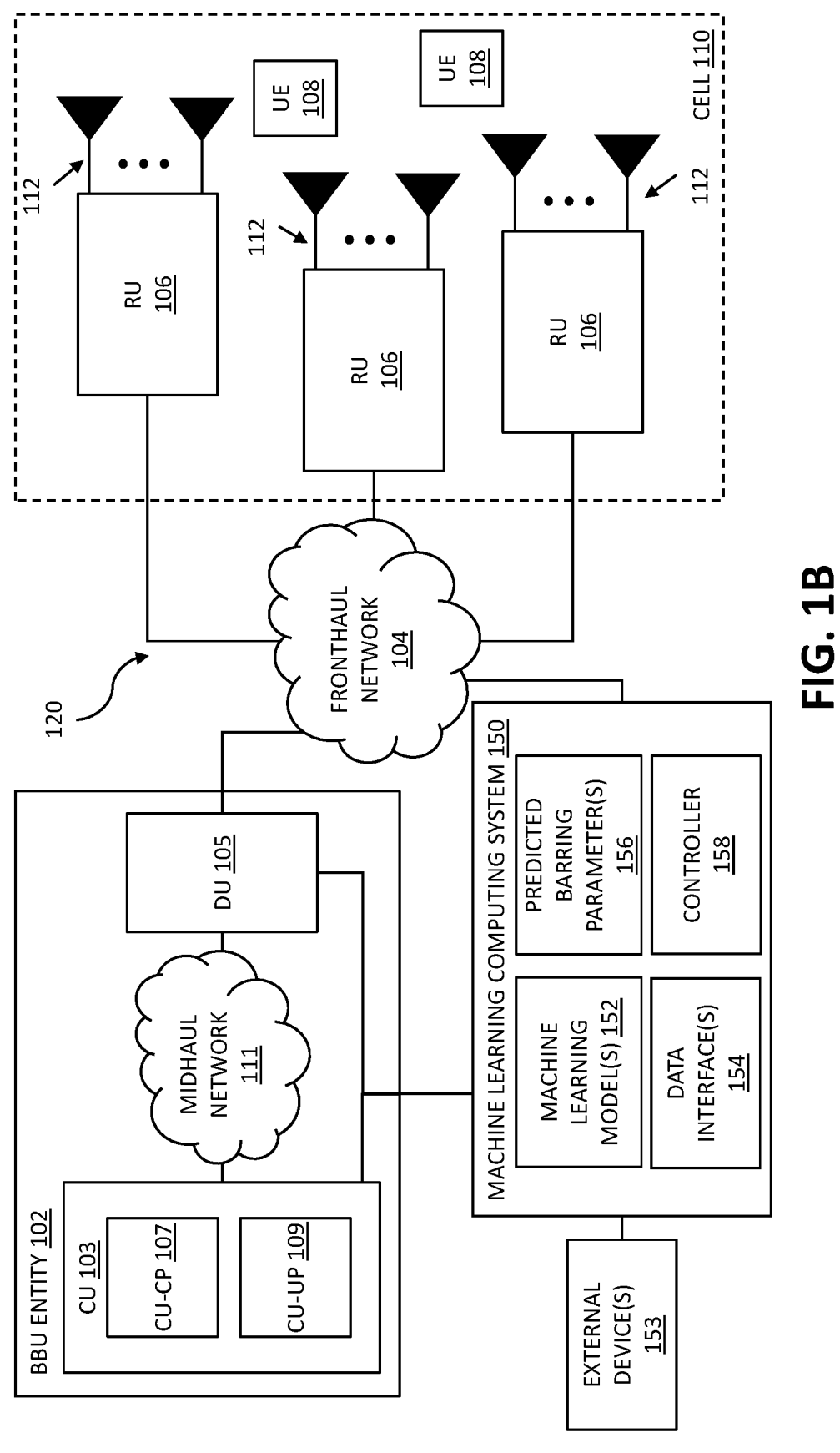

FIG. 1B is a block diagram illustrating an example base station 120 in which the techniques for machine learning based access class barring described herein can be implemented. In the particular example shown in FIG. 1B, the base station 120 includes one or more BBU entities 102 communicatively coupled to multiple RUs 106 via a fronthaul network 104. The base station 120 provides wireless service to various UEs 108 in a cell 110. Each BBU entity 102 can also be referred to simply as a "BBU."

In the example shown in FIG. 1B, the one or more BBU entities 102 comprise one or more CUs 103 and one or more DUs 105. Each CU 103 implements Layer-3 and non-time critical Layer-2 functions for the associated base station 100. Each DU 105 is configured to implement the time critical Layer-2 functions and at least some of the Layer-1 (also referred to as the Physical Layer) functions for the associated base station 120. Each CU 103 can be further partitioned into one or more control-plane and user-plane entities 107, 109 that handle the control-plane and user-plane processing of the CU 103, respectively. Each such control-plane CU entity 107 is also referred to as a "CU-CP" 107, and each such user-plane CU entity 109 is also referred to as a "CU-UP" 109.

The RUs 106 are configured to implement the control-plane and user-plane Layer-1 functions not implemented by the DU 105 as well as the radio frequency (RF) functions. Each RU 106 is typically located remotely from the one or more BBU entities 102 and located remotely from other RUs 106. In the example shown in FIG. 1B, each RU 106 is implemented as a physical network function (PNF) and is deployed in or near a physical location where radio coverage is to be provided in the cell 110. In the example shown in FIG. 1B, the RUs 106 are communicatively coupled to the DU 105 using a fronthaul network 104. In some examples, the fronthaul network 104 is a switched Ethernet fronthaul network (for example, a switched Ethernet network that supports the Internet Protocol (IP)).

Each of the RUs 106 includes or is coupled to a respective set of antennas 112 via which downlink RF signals are radiated to UEs 108 and via which uplink RF signals transmitted by UEs 108 are received. In some examples, each set of antennas 112 includes two or four antennas. However, it should be understood that each set of antennas 112 can include two or more antennas 112. In one configuration (used, for example, in indoor deployments), each RU 106 is co-located with its respective set of antennas 112 and is remotely located from the one or more BBU entities 102 serving it and the other RUs 106. In another configuration (used, for example, in outdoor deployments), the sets of antennas 112 for the RUs 106 are deployed in a sectorized configuration (for example, mounted at the top of a tower or mast). In such a sectorized configuration, the RUs 106 need not be co-located with the respective sets of antennas 112 and, for example, can be located at the base of the tower or mast structure, for example, and, possibly, co-located with the serving one or more BBU entities 102. Other configurations can be used.

The base stations 100, 120 that include the components shown in FIGS. 1A-1B can be implemented using a scalable cloud environment in which resources used to instantiate each type of entity can be scaled horizontally (that is, by increasing or decreasing the number of physical computers or other physical devices) and vertically (that is, by increasing or decreasing the "power" (for example, by increasing the amount of processing and/or memory resources) of a given physical computer or other physical device). The scalable cloud environment can be implemented in various ways. For example, the scalable cloud environment can be implemented using hardware virtualization, operating system virtualization, and application virtualization (also referred to as containerization) as well as various combinations of two or more of the preceding. The scalable cloud environment can be implemented in other ways. In some examples, the scalable cloud environment is implemented in a distributed manner. That is, the scalable cloud environment is implemented as a distributed scalable cloud environment comprising at least one central cloud, at least one edge cloud, and at least one radio cloud.

In some examples, one or more components of the one or more BBU entities 102 (for example, the CU 103, CU-CP 107, CU-UP 109, and/or DU 105) are implemented as a software virtualized entities that are executed in a scalable cloud environment on a cloud worker node under the control of the cloud native software executing on that cloud worker node. In some such examples, the DU 105 is communicatively coupled to at least one CU-CP 107 and at least one CU-UP 109, which can also be implemented as software virtualized entities. In some other examples, one or more components of the one or more BBU entities 102 (for example, the CU-CP 107, CU-UP 109, and/or DU 105) are implemented as a single virtualized entity executing on a single cloud worker node. In some examples, the at least one CU-CP 107 and the at least one CU-UP 109 can each be implemented as a single virtualized entity executing on the same cloud worker node or as a single virtualized entity executing on a different cloud worker node. However, it is to be understood that different configurations and examples can be implemented in other ways. For example, the CU 103 can be implemented using multiple CU-UP VNFs and using multiple virtualized entities executing on one or more cloud worker nodes. Moreover, it is to be understood that the CU 103 and DU 105 can be implemented in the same cloud (for example, together in a radio cloud or in an edge cloud). In some examples, the DU 105 is configured to be coupled to the CU-CP 107 and CU-UP 109 over a midhaul network 111 (for example, a network that supports the Internet Protocol (IP)). Other configurations and examples can be implemented in other ways.

As discussed above, there is a need for improved access class barring in networks during events and emergency situations. To help facilitate this for the base station 100, 120, a machine learning computing system 150 is communicatively coupled to one or more components of the base station 100, 120. The machine learning computing system 150 is configured to predict one or more barring parameters, and one or more components of the network are configured to adjust barring factor(s) and/or barring time(s) for the cell 110 based on the predicted one or more barring parameters. The techniques described herein enable the base stations 100, 120 to dynamically configure the barring factor(s) and/or barring time(s) based on real-time patterns and needs, which leads to better capacity utilization and less congestion in the network.

In the examples shown in FIGS. 1A-1B, the machine learning computing system 150 is communicatively coupled to the BBU entity 102 and the RU(s) 106. In some examples, the machine learning computing system 150 is communicatively coupled to the CU 103, DU 105, and RUs 106. In other examples, the machine learning computing system 150 is communicatively coupled to a subset of the CU 103, DU 105, and RUs 106. In some examples, the machine learning computing system 150 is a general-purpose computing device (for example, a server) equipped with at least one (and optionally more than one) graphics processing unit (GPU) for faster machine-learning-based processing. In some examples, the machine learning computing system 150 is implemented in more than one physical housing, each with at least one GPU. The machine learning computing system 150 is a host for one or more machine learning models 152 that predict barring parameters for access classes/identities of UEs in the cell 110 served by the base station 100, 120 and/or traffic type/category. In some examples, the predicted barring parameters include one or more barring factors and/or one or more barring times. In some examples, the machine learning computing system 150 is communicatively coupled to and configured to serve a single base station. In other examples, the machine learning computing system 150 is communicatively coupled to and configured to serve multiple base stations. The number of base stations that the machine learning computing system 150 is communicatively coupled to can be determined based on deployment needs and scale.

In some examples, the machine learning computing system 150 includes one or more interfaces 154 configured to receive time data. The time data can include, for example, the current time of day, day of the week, and/or whether the current day is a holiday. In some examples, the time data is provided by one or more external devices 153 that are separate and distinct from the machine learning computing system 150. For example, the one or more external devices 153 configured to provide time data to the machine learning computing system 150 can be a tracker, sensor, or Internet-of-Things (IOT) device. In other examples, at least a portion of the time data is provided by an internal component of the machine learning computing system 150 (for example, an internal clock).

In some examples, the machine learning computing system 150 also includes one or more interfaces 154 configured to receive traffic data. The one or more interfaces 154 configured to receive traffic data can be the same interface(s) 154 or different interface(s) 154 compared to the one or more interfaces 154 configured to receive time data. In some examples, the traffic data is provided to the machine learning computing system 150 by one or more components of the base station (for example, the BBU entity 102 and/or the RUs 106). In other examples, the traffic data is provided to the machine learning computing system 150 by a device that is external to the base station (for example, from a core network communicatively coupled to the base station). The traffic data can include, for example, load factor data (indicates the types of loads contributing to capacity usage) and/or congestion factor data (indicates the rejection rate for UEs that have passed ACB barring check and sent an RRC request).

In some examples, the load factor data can be broken down into multiple categories (for example, corresponding to different RRC establishment causes) that are each separate independent variable inputs. For example, the load factor data can be split into non-voice load (mobile originated data/signaling/video call/SMS), voice load (mobile originated voice call), paging load (mobile terminated signaling), and high-priority load (emergency, High-Priority Access (HPA), Mobile Priority Service (MPS), Mission Critical Service (MCS)). The RRC establishment cause (for example, data, signaling, paging, voice call, video call, emergency, etc.) is indicated by the UE when establishing an RRC connection.

In some examples, the congestion factor can be broken down into multiple categories that are each separate independent variable inputs. For example, the congestion factor can be split into the RRC rejection rate for normal users and the RRC rejection rate for high-priority users. Some example reasons for rejection can include a lack of Radio Resource Management (RRM) resources, lack of support channel resources (for example, SRS resources), and/or the load factor is too high (for example, PDCP levels are already dropping data and the L1 starts dropping data).

In some examples, the machine learning computing system 150 also includes one or more interfaces 154 configured to receive location data. The one or more interfaces 154 configured to receive location data can be the same interface(s) 154 or different interface(s) 154 compared to the one or more interfaces 154 configured to receive time data and/or traffic data. The location data can include, for example, a type of location for the cell 110 (for example, airport, stadium, office building, etc.).

The machine learning computing system 150 includes a machine learning model 152 that is configured to determine one or more predicted barring parameters 156 for the cell 110 based on the time data, the traffic data, and the location data. In some examples, the machine learning computing system 150 is configured to determine predicted barring parameters 156 applicable to multiple access classes/identities of UEs 108 in the cell 110 and/or multiple traffic types/categories at a particular time or time period. In other examples, the machine learning computing system 150 is configured to determine predicted barring parameters 156 for each access class/identity of UE 108 in the cell 110 and/or each traffic type/category at a particular time or time period. In some examples, the machine learning computing system 150 is configured to determine predicted barring parameters 156 for each type of application used by UEs 108 in the cell 110.

In some examples, the machine learning model 152 is a multinomial regression model, and the machine learning computing system 150 utilizes the time data, the traffic data, and the location data as independent variables in a predictor function of the machine learning model 152. In such examples, the predicted barring parameter(s) 156 are the dependent variable(s) in the predictor function of the machine learning model 152. Each independent variable in the predictor function is associated with a specific weight/coefficient determined via training and the weights/coefficients can be updated during operation of the system.

The time data (including current time of day and day of week) is encoded and used by the machine learning model 152 in a manner that does not apply a higher weight to a particular time of day by default (for example, where 11:00 AM is weighted higher than 10:00 AM by virtue of being associated with a larger number). In some examples, the time of day is divided into segments (for example, 15-minute increments) and the predictor function utilizes a binary variable for indicating that the current time falls within a particular segment. For example, a one can be used to indicate that the current time is within a particular time segment, and a zero can be used to indicate that the current time is not within a particular segment. Similarly, the predictor function can utilize a binary variable for indicating that the current day of the week is a particular day of the week. For example, a one can be used to indicate that the current day of the week is a particular day of the week, and a zero can be used to indicate that the current day of the week is not a particular day of the week.

In examples where the time data also includes information regarding whether the current day is a holiday, this information is also encoded and used by the machine learning model 152 in a manner that does not apply a higher weight to a particular holiday by default. In some examples, the information regarding whether the current day is a holiday can be indicated using a binary variable such that any day that is a holiday will be encoded as a first state (for example, using a one) and any day that is not a holiday will be encoded as the other state (for example, using a zero). In other examples, each specific holiday can be associated with a different independent variable that is binary in a manner similar to the time segments discussed above.

In some examples, the traffic data is encoded as a percentage. For each separate independent variable for load factor data, the input is a percentage of the overall RRC requests for a particular RRC establishment (non-voice load, voice load, paging load, and high-priority load, etc.). In examples where all types of RRC establishment (for example, ten types that are included in the 3GPP specifications) are accounted for in the machine learning model 152, then the total percentage for all of the load factor inputs would equal 100%. However, in some examples, less than all (for example, only those provided above) types of RRC establishment are included as inputs for the machine learning model 152. For each separate independent variable for congestion factor data, the input is a percentage of the overall rejections for a particular type of user (for example, normal user or high-priority user). The total percentage for all of the congestion factor inputs will equal 100%.

In some examples, the location data is encoded and used by the machine learning model 152 in a manner that does not apply a higher weight to a particular location area by default (for example, where a location area identifier is weighted higher than a different location area identifier by virtue of being associated with a larger number). In some examples, the location data is divided into segments (for example, each type of location as a separate independent variable) and the predictor function utilizes a binary variable for indicating that the current location being considered is a particular type of location. For example, a one can be used to indicate that the current location area is within a particular type of location, and a zero can be used to indicate that the current location area is not a particular type of location.

In some examples, a single predicted barring parameter 156 output by the machine learning model 152 indicates a barring factor or a barring time to be used for multiple access classes/identities or multiple types/categories of traffic. In other examples, the machine learning model 152 outputs multiple predicted barring parameters 156 that indicate barring factors or barring times to be used for UEs 108 having a particular class/identity or for a particular type/category of traffic (for example, RRC establishment cause).

In order to reliably predict the barring parameters, the machine learning model 152 is trained in order to determine the weights/coefficients using supervised learning prior to operation. In some examples, real-world time data, traffic data, and location data is used for training the machine learning model 152. In such examples, synthetically generated barring parameters are used as the dependent variables for training since current systems only use the limited techniques described above. In some examples, synthetic (non-real world) time data, traffic data, and/or location data is generated for the independent variables and synthetic barring parameters are generated for dependent variables. In some examples, the weights/coefficients are determined using an iterative procedure or other supervised learning training techniques. In some examples, the objective for training the machine learning model 152 is to predict the barring parameters(s) that will increase capacity utilization while avoiding congestion.

Once the machine learning model 152 is trained, the machine learning computing system 150 is configured to use the time data, the traffic data, and the location data as inputs for the machine learning model 152 and determine one or more predicted barring parameters 156 for the cell 110. In some examples, the machine learning computing system 150 is configured to perform additional learning during operation and adapt the weights/coefficients based on real-world time data, traffic data, and/or location data. Other performance parameters can also be used for the additional learning during operation.

In some examples, the number of independent variables of the machine learning model 152 can be selected during training based on the desired level of accuracy and computational load demands for the machine learning model 152. In theory, a greater number of independent variables for the time data, traffic data, and location data can provide a more accurate prediction of the barring parameters assuming that the machine learning model 152 is sufficiently trained. However, the computational load demands and the time required for training increase when using a higher number of independent variables.

In some examples, the number of possible distinct outputs (for example, number of barring parameter categories) of the machine learning model 152 can be selected during training based on the needs and capabilities of the system. For example, since 4G LTE systems are less capable to apply different barring parameters for UEs with different class/identity or for different types/categories of traffic, the machine learning model 152 for 4G LTE base stations can be configured to have fewer barring parameters output in some examples. A greater number of possible distinct outputs of the machine learning model 152 could help provide better ACB compared to a lower number of possible distinct outputs due to a more granular barring parameter prediction. However, the machine learning model 152 will likely take longer to train if there is a large number of possible distinct outputs.

While a single machine learning model 152 may provide sufficient accuracy for some applications, it may be desirable or necessary to increase the accuracy of the predicted barring parameter(s) 156. One potential approach for increasing the accuracy of the predicted barring parameter 156 is to use multiple machine learning models 152 that are each specific to a subset of the time data, traffic data, and/or location data. This approach reduces the number of independent variables, which reduces the complexity of the predictor function and can result in reduced computational load and/or increased accuracy of the output.

In some examples, multiple machine learning models 152 directed to specific subsets of the time data are utilized by the machine learning computing system 150. In some such examples, each respective machine learning model 152 is directed to a particular time of day (for example, morning, afternoon, or evening). In other such examples, each respective machine learning model 152 is directed to a particular day of the week (for example, Monday, Tuesday, etc.) or grouped day of the week (for example, weekdays or weekends). In other such examples, each respective machine learning model 152 is directed to a particular holiday status (for example, holiday or non-holiday).

In some examples, multiple machine learning models 152 directed to specific subsets of the traffic data are utilized by the machine learning computing system 150. In some such examples, each respective machine learning model 152 is directed to a particular type of traffic (for example, RRC establishment cause). In other such examples, each respective machine learning model 152 is directed to a particular category of user (for example, normal or high priority) that corresponds to the congestion factors.

In some examples, multiple machine learning models 152 directed to specific subsets of the location data are utilized by the machine learning computing system 150. In some such examples, each respective machine learning model 152 is directed to a specific type of location data.

In some examples, multiple machine learning models 152 directed to a combination of the subsets discussed above can be used to increase the accuracy of the predicted barring parameter(s) 156.

In some examples, one or more components of the system (for example, a controller 158 of the machine learning computing system 150, BBU entity 102, and/or RUs 106) are configured to adjust the barring factor(s) in the System Information Blocks (SIBs) based on the predicted barring parameter(s) 156 and send the updated SIBs to UEs 108 in the cell 110. In some examples, one or more components of the system (for example, a controller 158 of the machine learning computing system 150, BBU entity 102, and/or RUs 106) are configured to adjust the barring time(s) in the System Information Blocks (SIBs) based on the predicted barring parameters(s) and send the updated SIBs to UEs 108 in the cell 110.

Figure 2:
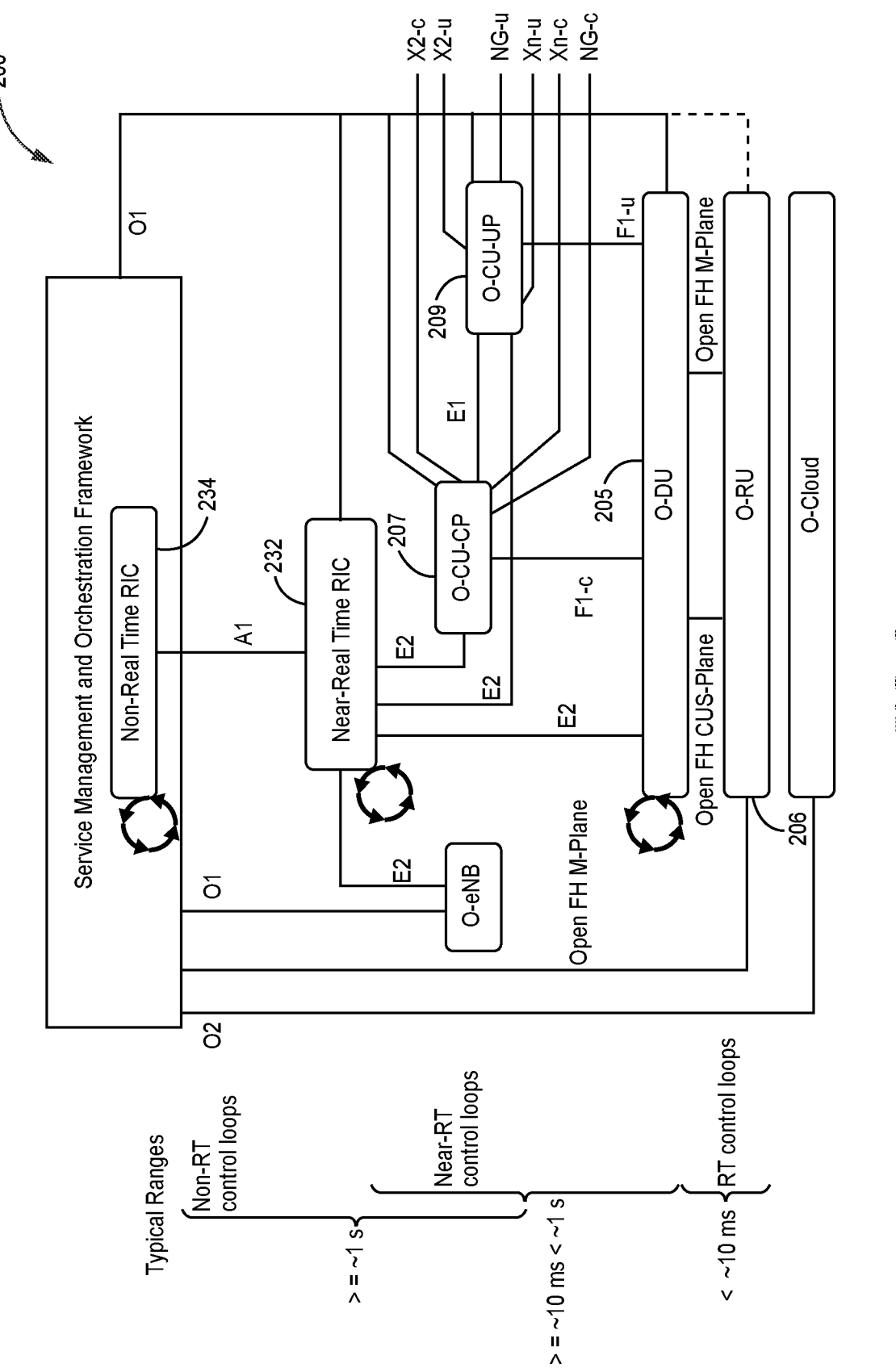
FIG. 2 is a block diagram illustrating an example radio access network.

FIG. 2 is a block diagram illustrating an example base station 200 in which the techniques for machine learning based access class barring described herein can be implemented. In the particular example shown in FIG. 2, the base station 200 includes one or more central units (CUs), one or more distributed units (DUs), and one or more radio units (RUs). Each RU is located remotely from each CU and DU serving it.

The base station 200 is implemented in accordance with one or more public standards and specifications. In some examples, the base station 200 is implemented using the logical RAN nodes, functional splits, and front-haul interfaces defined by the Open Radio Access Network (O-RAN)

Alliance. In the example shown in FIG. 2, each CU, DU, and RU is implemented as an O-RAN central unit (O-CU), O-RAN distributed unit (O-DU) 205, and O-RAN radio unit (O-RU) 206, respectively, in accordance with the O-RAN specification.

In the example shown in FIG. 2, the base station 200 includes a single O-CU, which is split between an O-CU-CP 207 that handles control-plane functions and an O-CU-UP 209 that handles user-plane functions. The O-CU comprises a logical node hosting Packet Data Convergence Protocol (PDCP), Radio Resource Control (RRC), Service Data Adaptation Protocol (SDAP), and other control functions. Therefore, each O-CU implements the gNB controller functions such as the transfer of user data, mobility control, radio access network sharing, positioning, session management, etc. The O-CU(s) control the operation of the O-DUs 205 over an interface (including F1-c and F1-u for the control plane and user plane, respectively).

In the example shown in FIG. 2, the single O-CU handles control-plane functions, user-plane functions, some non-real-time functions, and/or PDCP processing. The O-CU-CP 207 may communicate with at least one wireless service provider's Next Generation Cores (NGC) using a 5G NG-C interface and the O-CU-UP 209 may communicate with at least one wireless service provider's NGC using a 5G NG-u interface.

Each O-DU 205 comprises a logical node hosting (performing processing for) Radio Link Control (RLC) and Media Access Control (MAC) layers, as well as optionally the upper or higher portion of the Physical (PHY) layer (where the PHY layer is split between the DU and RU). In other words, the O-DUs 205 implement a subset of the gNB functions, depending on the functional split (between O-CU and O-DU 205). In some configurations, the Layer-3 processing (of the 5G air interface) may be implemented in the O-CU and the Layer-2 processing (of the 5G air interface) may be implemented in the O-DU 205.

The O-RU 206 comprises a logical node hosting the portion of the PHY layer not implemented in the O-DU 205 (that is, the lower portion of the PHY layer) as well as implementing the basic RF and antenna functions. In some examples, the O-RUs 206 may communicate baseband signal data to the O-DUs 205 on Open Fronthaul CUS-Plane or Open Fronthaul M-plane interface. In some examples, the O-RU 206 may implement at least some of the Layer-1 and/or Layer-2 processing. In some configurations, the O-RUs 206 may have multiple ETHERNET ports and can communicate with multiple switches.

Although the O-CU (including the O-CU-CP 207 and O-CU-UP 209), O-DU 205, and O-RUs 206 are described as separate logical entities, one or more of them can be implemented together using shared physical hardware and/or software. For example, in the example shown in FIG. 2, for each cell, the O-CU (including the O-CU-CP 207 and O-CU-UP 209) and O-DU 205 serving that cell could be physically implemented together using shared hardware and/or software, whereas each O-RU 206 would be physically implemented using separate hardware and/or software. Alternatively, the O-CU(s) (including the O-CU-CP 207 and O-CU-UP 209) may be remotely located from the O-DU(s) 205.

In the example shown in FIG. 2, the base station 200 further includes a non-real time RAN intelligent controller (RIC) 234 and a near-real time RIC 232. The non-real time RIC 234 and the near-real time RIC 232 are separate entities in the O-RAN architecture and serve different purposes. In some examples, the non-real time RIC 234 is implemented as a standalone application in a cloud network. In other examples, the non-real time RIC 234 is integrated with a Device Management System (DMS) or Service Orchestration (SO) tool. In some examples, the near-real time RIC 232 is implemented as a standalone application in a cloud network. In other examples, the near-real time RIC 232 is embedded in the O-CU. The non-real time RIC 234 and/or the near-real time RIC 232 can also be deployed in other ways.

The non-real time RIC 234 is responsible for non-real time flows in the system (typically greater than or equal to 1 second) and configured to execute one or more machine learning models, which are also referred to as "rApps." The near-real time RIC 232 is responsible for near-real time flows in the system (typically 10 ms to 1 second) and configured to execute one or more machine learning models, which are also referred to as "xApps."

In some examples, the non-real time RIC 234 shown in FIG. 2 can be configured to operate in a manner similar to the machine learning computing system 150 described above with respect to FIGS. 1A-1B. In some such examples, the functionality of the machine learning computing system 150 is implemented as an rApp that is configured to run on the non-real time RIC 234. The non-real time RIC 234 is configured to predict barring parameter(s) for UEs in the cell in a manner similar to that described above, and one or more components of the base station 200 are configured to adjust the barring factor(s) and/or barring time(s) in messages that are broadcast to the UEs in the cell.

FIG. 3 illustrates a flow diagram of an example method 300 for providing machine learning based access class barring. The common features discussed above with respect to the base stations in FIGS. 1A-2 can include similar characteristics to those discussed with respect to method 300 and vice versa. In some examples, the method 300 is performed by a base station (for example, base station 100, 120, 200).

The blocks of the flow diagram in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel in an event-driven manner).

The method 300 begins with receiving time data, traffic data, and location data (block 302). In some examples, the time data includes the current time of day, the current day of the week, and/or whether the current day is a holiday. In some examples, the traffic data includes load factor data and congestion factor data. In some examples, the location data includes the type of location that includes the cell.

The method 300 includes determining predicted barring parameter(s) based on the time data, the traffic data, and the location data (block 304). In some examples, predicting the barring parameter(s) includes predicting a single barring parameter that is applicable to multiple access classes/identities of user equipment in the cell and/or multiple traffic types/categories. In other examples, predicting the barring parameter(s) includes predicting respective barring parameters for UEs having respective access class/identity in the cell and/or traffic type/category. In some examples, the predicted barring parameter(s) include one or more predicted barring factors. In some examples, the predicted barring parameter(s) include one or more predicted barring times. In some examples, the predicted barring parameter(s)

include one or more predicted barring factors and one or more predicted barring times.

The method 300 includes adjusting barring factor(s) and/or barring time(s) in information messages to UEs based on the predicted barring parameter(s) (block 306). In some examples, one or more components of the radio access network are configured to adjust the barring factor(s) and/or barring time(s) in the information messages (for example, System Information Blocks (SIB s)).

The method 300 further includes sending information messages to UEs with the adjusted barring factor(s) and/or adjusted barring time(s) for use in access attempts (block 308). In some examples, the information messages are broadcast from RUs of the base station to UEs in the cell.

Other examples are implemented in other ways.

The systems and methods described herein may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Example Embodiments

Example 1 includes a system, comprising: at least one baseband unit (BBU) entity; one or more radio units communicatively coupled to the at least one BBU entity; one or more antennas communicatively coupled to the one or more radio units, wherein each respective radio unit of the one or more radio units is communicatively coupled to a respective subset of the one or more antennas; wherein the at least one BBU entity, the one or more radio units, and the one or more antennas are configured to implement a base station for wirelessly communicating with user equipment in a cell; and a machine learning computing system configured to: receive time data, traffic data, and location data; and determine one or more predicted barring parameters for the base station based on the time data, the traffic data, and the location data; wherein the system is configured to: adjust one or more barring factors and/or one or more barring times in an information message based on the one or more predicted barring parameters for the base station; and send the information message with the adjusted one or more barring factors and/or one or more barring times to user equipment in the cell.

Example 2 includes the system of Example 1, wherein the time data, the traffic data, and the location data include: a time of day; a day of week; an indicator of whether it is a holiday; a load factor; a congestion factor; and a type of location when the base station resides.

Example 3 includes the system of any of Examples 1-2, wherein the machine learning computing system is configured to determine a single predicted barring parameter for the base station that is applicable to multiple access classes/identities of user equipment in the cell and/or multiple traffic types/categories.

Example 4 includes the system of any of Examples 1-3, wherein the machine learning computing system is configured to: determine a first predicted barring parameter for the base station that is applicable to a first access class/identity of user equipment in the cell and/or a first traffic type/category; and determine a second predicted barring parameter for the base station that is applicable to a second access class/identity of user equipment in the cell and/or a second traffic type/category.

Example 5 includes the system of Example 4, wherein the first access class/identity of user equipment in the cell and/or the second access class/identity of user equipment in the cell includes high-priority users.

Example 6 includes the system of any of Examples 4-5, wherein the first traffic type/category and/or the second traffic type/category includes high-priority traffic or emergency traffic.

Example 7 includes the system of any of Examples 1-6, wherein the one or more predicted barring parameters include one or more predicted barring factors.

Example 8 includes the system of any of Examples 1-7, wherein the one or more predicted barring parameters include one or more predicted barring times.

Example 9 includes the system of any of Examples 1-8, wherein the one or more predicted barring parameters include one or more predicted barring factors and one or more predicted barring times.

Example 10 includes the system of any of Examples 1-9, wherein the one or more radio units includes a plurality of radio units, wherein the one or more antennas includes a plurality of antennas.

Example 11 includes the system of any of Examples 1-10, wherein the at least one BBU entity includes a central unit communicatively coupled to a distributed unit, wherein the distributed unit is communicatively coupled to the one or more radio units, wherein the machine learning computing system is implemented in a radio access network intelligent controller.

Example 12 includes a method, comprising: receiving time data, traffic data, and location data; determining one or more predicted barring parameters for a base station based on the time data, the traffic data, and the location data, wherein at least one baseband unit (BBU) entity, one or more radio units, and one or more antennas are configured to implement the base station for wirelessly communicating with user equipment in a cell, wherein the one or more radio units communicatively coupled to the at least one BBU entity, wherein the one or more antennas are communicatively coupled to the one or more radio units, wherein each respective radio unit of the one or more radio units is communicatively coupled to a respective subset of the one or more antennas; adjusting one or more barring factors and/or one or more barring times in an information message based on the one or more predicted barring parameters for the base station; and sending the information message with the adjusted one or more barring factors and/or one or more barring times to user equipment in the cell.

Example 13 includes the method of Example 12, wherein the time data, the traffic data, and the location data include: a time of day; a day of week; an indicator of whether it is a holiday; a load factor; a congestion factor; and a type of location when the base station resides.

Example 14 includes the method of any of Examples 12-13, wherein determining one or more predicted barring parameters for a base station based on the time data, the traffic data, and the location data includes determining a single predicted barring parameter for the base station that is applicable to multiple access classes/identities of user equipment in the cell and/or multiple traffic types/categories.

Example 15 includes the method of any of Examples 12-14, wherein determining one or more predicted barring parameters for a base station based on the time data, the traffic data, and the location data includes: determining a first predicted barring parameter for the base station that is applicable to first access class/identity of user equipment in the cell and/or a first traffic type/category; and determining a second predicted barring parameter for the base station that is applicable to a second access class/identity of user equipment in the cell and/or a second traffic type/category.

Example 16 includes the method of Example 15, wherein the first access class/identity of user equipment in the cell and/or the second access class/identity of user equipment in the cell includes high-priority users.

Example 17 includes the method of any of Examples 15-16, wherein the first traffic type/category and/or the second traffic type/category includes high-priority traffic or emergency traffic.

Example 18 includes the method of any of Examples 12-17, wherein the one or more predicted barring parameters include one or more predicted barring factors.

Example 19 includes the method of any of Examples 12-18, wherein the one or more predicted barring parameters include one or more predicted barring times.

Example 20 includes the method of any of Examples 12-19, wherein the one or more predicted barring parameters include one or more predicted barring factors and one or more predicted barring times.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A system, comprising:
at least one baseband unit (BBU) entity;
one or more radio units communicatively coupled to the at least one BBU entity;
one or more antennas communicatively coupled to the one or more radio units, wherein each respective radio unit of the one or more radio units is communicatively coupled to a respective subset of the one or more antennas;
wherein the at least one BBU entity, the one or more radio units, and the one or more antennas are configured to implement a base station for wirelessly communicating with user equipment in a cell; and
a machine learning computing system configured to:
receive time data, traffic data, and location data; and predict one or more predicted barring parameters for the base station based on the time data, the traffic data, and the location data;

wherein the system is configured to:

adjust at least one barring factor or barring time in an information message based on the one or more predicted barring parameters for the base station to generate adjusted at least one barring factor or barring time; and send the information message with the adjusted at least one barring factor or barring time to user equipment in the cell.

2. The system of claim 1, wherein the time data, the traffic data, and the location data include:

a time of day;

a day of week;

an indicator of whether it is a holiday;

a load factor;

a congestion factor; and a type of location when the base station resides.

3. The system of claim 1, wherein the machine learning computing system is configured to predict a single predicted barring parameter for the base station that is applicable to multiple access classes or identities of user equipment in the cell or multiple traffic types or categories.

4. The system of claim 1, wherein the machine learning computing system is configured to:

predict a first predicted barring parameter for the base station that is applicable to a first access class or identity of user equipment in the cell or a first traffic type or category; and predict a second predicted barring parameter for the base station that is applicable to a second access class or identity of user equipment in the cell or a second traffic type or category.

5. The system of claim 4, wherein the first access class or identity of user equipment in the cell or the second access class or identity of user equipment in the cell includes high-priority users.

6. The system of claim 4, wherein the first traffic type or category or the second traffic type or category includes high-priority traffic or emergency traffic.

7. The system of claim 1, wherein the one or more predicted barring parameters include one or more predicted barring factors.

8. The system of claim 1, wherein the one or more predicted barring parameters include one or more predicted barring times.

9. The system of claim 1, wherein the one or more predicted barring parameters include one or more predicted barring factors and one or more predicted barring times.

10. The system of claim 1, wherein the one or more radio units includes a plurality of radio units, wherein the one or more antennas includes a plurality of antennas.

11. The system of claim 1, wherein the at least one BBU entity includes a central unit communicatively coupled to a distributed unit, wherein the distributed unit is communicatively coupled to the one or more radio units, wherein the machine learning computing system is implemented in a radio access network intelligent controller.

12. A method, comprising:

receiving time data, traffic data, and location data;

predicting one or more predicted barring parameters for a base station based on the time data, the traffic data, and the location data, wherein at least one baseband unit (BBU) entity, one or more radio units, and one or more antennas are configured to implement the base station for wirelessly communicating with user equipment in a cell, wherein the one or more radio units communicatively coupled to the at least one BBU entity, wherein the one or more antennas are communicatively coupled to the one or more radio units, wherein each respective radio unit of the one or more radio units is communicatively coupled to a respective subset of the one or more antennas;

adjusting at least one barring factor or barring time in an information message based on the one or more predicted barring parameters for the base station to generate adjusted at least one barring factor or barring time; and sending the information message with the adjusted at least one or more barring factor or barring time to user equipment in the cell.

13. The method of claim 12, wherein the time data, the traffic data, and the location data include:

a time of day;

a day of week;

an indicator of whether it is a holiday;

a load factor;

a congestion factor; and a type of location when the base station resides.

14. The method of claim 12, wherein predicting one or more predicted barring parameters for a base station based on the time data, the traffic data, and the location data includes predicting a single predicted barring parameter for the base station that is applicable to multiple access classes or identities of user equipment in the cell or multiple traffic types or categories.

15. The method of claim 12, wherein predicting one or more predicted barring parameters for a base station based on the time data, the traffic data, and the location data includes:

predicting a first predicted barring parameter for the base station that is applicable to first access class or identity of user equipment in the cell or a first traffic type or category; and predicting a second predicted barring parameter for the base station that is applicable to a second access class or identity of user equipment in the cell or a second traffic type or category.

16. The method of claim 15, wherein the first access class or identity of user equipment in the cell or the second access class or identity of user equipment in the cell includes high-priority users.

17. The method of claim 15, wherein the first traffic type or category or the second traffic type or category includes high-priority traffic or emergency traffic.

18. The method of claim 12, wherein the one or more predicted barring parameters include one or more predicted barring factors.

19. The method of claim 12, wherein the one or more predicted barring parameters include one or more predicted barring times.

20. The method of claim 12, wherein the one or more predicted barring parameters include one or more predicted barring factors and one or more predicted barring times.

* * * * *